May 20, 1958 W. RAUSCHER 2,835,035
ARTIFICIAL TOOTH AND METHOD OF MAKING THE SAME
Filed July 26, 1952

INVENTOR.
WOLFDIETRICH RAUSCHER
BY
Michael S. Striker

2,835,035
ARTIFICIAL TOOTH AND METHOD OF MAKING THE SAME

Wolfdietrich Rauscher, Berlin-Spandau, Germany

Application July 26, 1952, Serial No. 301,013

Claims priority, application Germany August 8, 1951

11 Claims. (Cl. 32—10)

This invention relates to artificial teeth and it has for its object an improved artificial tooth.

According to my invention, I provide an artificial tooth with root which, at least in its outer layer, consists of synthetic material which is tolerated by the tissues constituting the human jaw, so that the said root grows firmly into the bone and gum tissue and does not cause any inflammation. It follows that such a tooth can be implanted into the jaw, similarly to a drawn and disinfected tooth, but that, unlike the latter, it is not reabsorbed by the jaw. Experiments have shown that such a tooth root has grown in approximately firmly enough to permit mastication after about eight days.

In an advantageous manner of carrying out the invention, the outer layer of synthetic material consists of a cartilaginous elastic substance, for example poly-ethylene, polymethacryl acid ester or the like, while the core of the tooth is made of a hard substance, such as a hard synthetic material, or a substance of biological origin, such as ivory, or again of a metal such as tantalum, steel, silver or a like metal. A root so constituted is thereby given the necessary strength and, owing to its softer outer layer, it adapts itself well to the tissues of the jaw.

A X-ray contrast material, for example tantalum in the form of a fine powder or of wire netting or the like, is advantageously admixed with a part of the artificial root (core or outer layer). This enables clear X-ray photographs to be obtained, so that the artificial tooth and its alveoli can be easily examined.

A particularly advantageous embodiment of the invention is obtained if the outer layer of the tooth is not circular in cross-section, but contains one or more longitudinal grooves open to the outside and leading to the neck of the root. This or these longitudinal groove or grooves is or are adapted to conduct off secretions from the biological tissues upwardly during healing-in, in a similar manner to the central channel of a natural tooth root, and the gum and jawbone then gradually grow from the bottom into the grooves, so that the latter contribute to the torsional strength of the artificial tooth. Instead of a circular cross-section with longitudinal grooves, the tooth may be given an angular cross-section, for example a regular hexagonal shape.

Transverse grooves or depressions of small area may also be provided in the outer layers. The gum and bone tissue will then also grow into these grooves or depressions and thus hold the artificial tooth firmly. These depressions can also serve to hold an antibiotic or chemotherapeutic substance adapted to reduce the danger of infection.

The single- and multi-rooted root bodies are advantageously so standardised that the axes of the roots are substantially parallel, being so disposed that the whole root body can be inserted without resistance into the alveoli. The axes of the roots may be exactly parallel or they may be inclined towards one another to such an extent that the outer surface lines of the approximately conical roots are parallel.

An advantageous method of producing the artificial tooth consists in providing a hard root core having external depressions and an upper pin with a cartilaginous-elastic outer layer by dipping it in a molten synthetic substance which is tolerable to the tissues, this root being provided after implanting with a conventional crown.

According to another embodiment, a hard root core, provided with an upper pin, is pressed and cemented into a shell of cartilaginous-elastic synthetic material which is tolerable to the tissues, and having external depressions, the root so constituted being provided with a crown after implantation.

Alternatively, the molten synthetic material which, after hardening, becomes cartilaginous-elastic, is sprayed on to a hard root core provided with external depression, and the root is provided with a crown after implantation.

Advantageously the surface of the outer layer of synthetic material contains corpuscles of ivory e. g. powder of ivory or similar bone-like corpuscles lying free to the outer side. Such corpuscles stimulate the growing of the adjacent bone, so that the growing-in of the root is accelerated, whereby the corpuscles are resorbed by the bone. The remaining synthetic layer ensures to the root as elastic covering unaffected by heat.

The corpuscles of ivory may be pressed into the surface of the synthetic layer, in a cold or warm process. Thereby only a small quantity of powder of ivory is necessary.

In another embodiment of the invention the powder of ivory may be mixed into the molten synthetic material and the surfaces of the solidified layer of this material may be worked by cutting, preferably by cutting-in a cylindrical thread, so that a part of the powder of ivory is exposed on the surface.

Thereby the bone after resorbing the corpuscles grows in the grooves built by the corpuscles. In the mean time the root can be screwed in an inner thread made in the jaw bone, so that the root is fastened immediately and the growing-in is advanced.

The corpuscles of ivory can be provided on the whole surface of the synthetic layer or only on a ring area in the neighbourhood of the boundary between bone and gum. In the last embodiment the powder of ivory can be pressed in on the root collar and the other portion of the root can be provided easily with a cylindrical thread. Thereby an initial shrinking of the bone in the neighbourhood of the root collar is prevented.

In another embodiment of the invention the root collar is surrounded by a ring-like arrangement containing ivory e. g. consisting of a mixture of powder of ivory and lactose or a similar chemical or biological substance tolerable to the tissue of bone and stimulating the growing of bone. Thereby the production is simplified and the root will heal-in rapidly.

Between the root collars of artificial teeth having several roots which are to be implanted or screwed independently into the alveoli, a disc of synthetic material formed with openings corresponding to the root collars may be inserted, so as to close the wound.

The invention also comprises a tool for inserting conveniently the artificial tooth, which tool consists of one or more approximately parallel driven millers of conical or cylindrical shape. One, two or three alveoli belonging to a tooth root can thereby be simultaneously cut in such a manner that they fit the standardised tooth root.

The milling tool is preferably provided with a stop adapted to bear on the adjoining tooth crowns or on the gum and which limits accurately the depth of cut.

Referring to the accompanying diagrammatic drawings.

which illustrate, as examples only, preferred manners of carrying out the invention:

Figure 1:
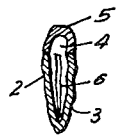
Figs. 1 to 3 show a longitudinal section, and elevation and a cross-section, respectively, of an artificial tooth according to the invention.

As shown in Fig. 1, an artificial tooth according to the invention consists of a hard core 2 of synthetic material, metal, for example steel, tantalum, silver or like metal, or a biological substance, for example ivory or the like, an outer layer 3 of softer synthetic material tolerable to the issues, for example poly-ethylene or polymethacrylacid ester, and a crown of metal or hard synthetic material fastened on an upper pin 4 in the usual manner by cementing or screwing. The outer layer 3 is provided with one or more longitudinal grooves 6 and one or more transverse grooves 7 and, if desired, small depressions 8 also. These grooves 6, 7 and depressions 8 can also be provided on the core 2. The longitudinal grooves 6 serve to conduct secretions in the upward direction during healing-in of the implanted tooth. The gum and bone tissues then grow in the channels 6, grooves 7 and depressions 8 and thus hold the tooth fast. The cartilaginous outer layer 3 can be applied to the core 2 by immersion in molten synthetic material or by spraying-on, or the shell 3 can be cast or moulded independently and the core 2 subsequently cemented in the same.

Figure 2:
Figure 10:
Fig. 10 is an elevation of an artificial tooth with three roots.

Single- and multi-rooted teeth are conveniently produced in the factory with standardised straight roots, as shown in Figs. 1, 2 and 10, the individual root axes—or at least the external surface lines of the approximately conical tooth roots—being so disposed as to be parallel to each other.

Figure 4:
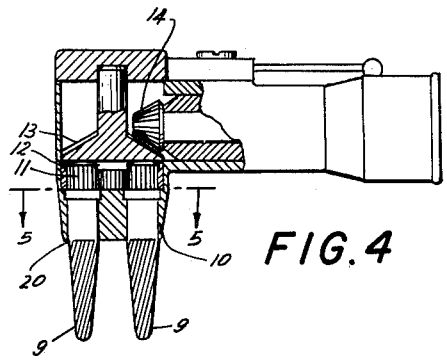
Fig. 4 is a longitudinal part section of a milling tool with drive, on an enlarged scale.
Figure 5:
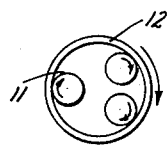
Fig. 5 is a cross-section of the milling tool, along 5—5 of Fig. 4.

To make alveoli adapted to receive the roots, tools with conical milling cutters are provided, as shown in Figs. 4 and 5, said cutters 9 being mounted with their axes parallel to each other in a housing 10 with a stop surface 20, and being solid each with a coaxial pinion 11 gearing with an internal crown wheel 12 provided externally with bevel teeth 13 gearing with a bevel pinion 14 driven by any suitable motor by means of a flexible shaft in the known manner, the housing 10 being secured to a conventional drill handle.

Figure 6:
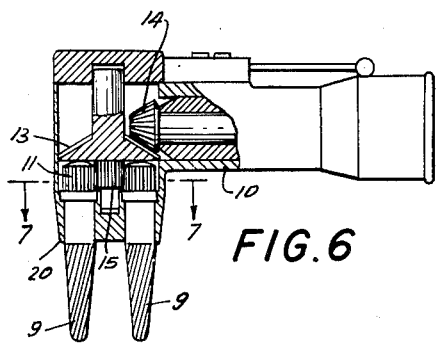
Fig. 6 is a longitudinal part section of an alternative design of a milling tool with drive, on an enlarged scale.
Figure 7:
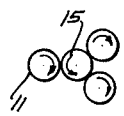
Fig. 7 is a cross-section of the milling tool shown in Fig. 6, along 7—7.
Figure 13:
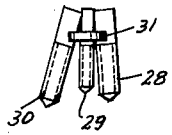
Fig. 13 is an arrangement of roots of a tooth having three roots and a disc, shown in elevation.
Figure 14:
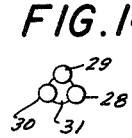
Fig. 14 is a plan view thereto.

Figs. 6 and 7 show an alternative method of driving the cutters, by means of a central pinion, instead of the crown wheel, driven by the bevel pinion 14 gearing with the bevel teeth 13, the remaining parts of the tool being the same.

Figure 8:
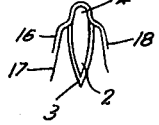
Fig. 8 is a diagrammatic view, in section, of a tooth in position, with a clamp holding it in position.
Figure 9:
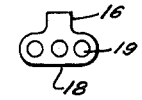
Fig. 9 is a front view of the clamp.

Figs. 8 and 9 show how an implanted artificial tooth 2—3, with its pin 4, is held in position on the gum 17 while healing-in by a clamp 16 of sheet metal or wire, having broad lugs 18 on either side which bear against the gum and are provided with holes 19 for sewing the clamp on to the gum.

Cutting tools such as shown in Figs. 4 to 7 can be designed to prepare alveoli for artificial teeth having from one to four roots. The cutters 9 can be directed slightly outwardly on the downward direction, so that the outer surface lines are vertical and the cutting tool can be conveniently inserted in and removed from the jaw.

For the purpose of implanting a single- or multi-rooted standardised tooth, the alveoli are cut in the maxillae with the help of the cutting tools described above, until the stop 20 bears against the gum; the disinfected artificial tooth, without crown, is pressed into position, the clamp 16—18 is placed over the pin 4 and pressed against the gum and fastened by sewing. After healing-in, the clamp is removed and a crown 5 of synthetic hard material or metal is cemented or screwed on to the pin 4. Two such artificial teeth can also be used for fastening bridges so that, in many cases, plates can be dispensed with.

Natural alveoli differing from the standardised artificially produced alveoli soon close up, so that practically any infected natural tooth which has been pulled out can be replaced in the jaw by a new artificial tooth according to this invention.

As shown in Fig. 10, the artificial roots 21 may also be angular in cross-section.

Figures 11, 12:
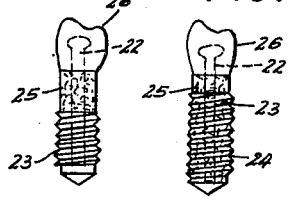
Fig. 11 is an artificial tooth with a root provided with powder of ivory.
Fig. 12 is another tooth with a collar ring containing powder of ivory.

According to Fig. 11 a metal core 22 is embedded in a cylindrical shell 23 consisting of polyethylene, polymethacrylacidester or the like and provided with a cylindrical thread 24 adapted to be screwed in a corresponding inner thread made in the jaw bone.

The shell of synthetic material 23 may contain powder of ivory 25 in its whole cross-section and in this case the thread 24 is cut-in and the collar of the root is shaped correspondingly in such manner, that the outer corpuscles of ivory are lying free on the surface.

The powder of ivory 25 can also be pressed on the layer of synthetic material subsequently in cold or warm state of the layer and in this case also the thread 24 is pressed in the artificial layer 23 in the mean time.

Such a root 22—25 is screwed in an inner thread of the jaw bone, in order to fasten it in the beginning, and the outer corpuscles of ivory will then stimulate the growing of the jaw bone, so that the corpuscles of ivory are resorbed quickly and the jaw bone grows into the grooves of the corpuscles. A crown 26 can be put on the root immediately after screwing the root or later.

According to Fig. 2 the metal core 22 has a shell of artificial material 23 provided only in its lower portion with a thread and on its collar provided with a ring 27 consisting of lactose or the like mixed with powder of ivory or having only a layer of powder of ivory pressed on the ring. Instead of lactose another material tolerable to the tissues can be used. Such rings can be manufactured in normal dimensions and can be pressed on the corresponding pressed or shaped roots of artificial material. Such ring prevents the initial shrinking of the jaw bone on the most endangered limit between bone and gum.

Figure 3:

According to Figs. 3 and 4 for multi-rooted teeth roots 28, 29, 30 for each single alveole are provided in similar manner as in Figs. 1 and 2; after screwing of these roots a disc 31 of polymethacrylacidester or the like spared on its periphery corresponding to the collars of the roots is clamped between the collars of the roots, so as to close the wound against infection. After healing-in a crown consisting of artificial resin, metal, porcelain or the like is cemented on the roots.

The inner thread in the jaw bone can be made with the aid of a cylindrical milling cutter and screw-tap inserted in a tool according to Figs. 4–7.

Instead of corpuscles of ivory similar chemical or biological means building or feeding bones can be used.

What I claim is:

1. A method of producing an artificial tooth consisting of producing a hard root-core provided with an upper pin and pressing and cementing it in a root of cartilaginous-elastic synthetic material tolerable by the tissues and having external depressions, said upper pin extending from said root-core and providing it with a conventional crown superimposed upon said upper pin after implantation.

2. A method as claimed in claim 1, wherein corpuscles of ivory are pressed into the surface of said root of synthetic material.

3. An artificial tooth comprising, in combination, a crown; a solid hard ivory core embedded in said crown and extending out of the same; and an artificial root completely covering the portion of said core extending out of said crown, at least the entire surface layer of said root consisting of synthetic material which is well tolerated by the tissues of the human jaw, whereby upon insertion of said artificial tooth into a human jaw the tissues of the jaw grow around said root without inflammation of the tissues due to their tolerance for the synthetic material of which at least the entire surface layer of said root consists so that said root becomes firmly embedded in the tissues of the jaw.

4. An artificial tooth comprising, in combination, a crown; a solid hard core embedded in said crown and extending out of the same; and an artificial root of polygonal cross-section completely covering the portion of said core extending out of said crown, at least the entire surface layer of said root consisting of synthetic material which is well tolerated by the tissues of the human jaw, whereby upon insertion of said artificial tooth into a human jaw the tissues of the jaw grow around said root without inflammation of the tissues due to their tolerance for the synthetic material of which at least the entire surface layer of said root consists so that said root becomes firmly embedded in the tissues of the jaw.

5. An artificial tooth comprising, in combination, a crown; a solid hard core embedded in said crown and extending out of the same; and an artificial root completely covering the portion of said core extending out of said crown, at least the entire surface layer of said root consisting of synthetic material which is well tolerated by the tissues of the human jaw, said surface layer of said artificial root being formed with small depressions in its outer surface, whereby upon insertion of said artificial tooth into a human jaw the tissues of the jaw grow around said root without inflammation of the tissues due to their tolerance for the synthetic material of which at least the entire surface layer of said root consists so that said root becomes firmly embedded in the tissues of the jaw.

6. An artificial tooth comprising, in combination, a crown; a solid hard core embedded in said crown and extending out of the same; and an artificial root completely covering the portion of said core extending out of said crown, at least the entire surface layer of said root consisting of synthetic material which is well tolerated by the tissues of the human jaw, said synthetic material having particles of ivory mixed into it and a portion of said ivory particles forming part of the outer face of said surface layer, whereby upon insertion of said artificial tooth into a human jaw the tissues of the jaw grow around said root without inflammation of the tissues due to their tolerance for the synthetic material of which at least the entire surface layer of said root consists so that said root becomes firmly embedded in the tissues of the jaw.

7. An artificial tooth comprising, in combination, a crown; a solid hard core embedded in said crown and extending out of the same; and an artificial root completely covering the portion of said core extending out of said crown, at least the entire surface layer of said root consisting of synthetic material which is well tolerated by the tissues of the human jaw, hard bone-like particles of animal origin mixed into at least a portion of said synthetic material and a portion of said bone-like particles forming part of the outer face of said surface layer, whereby upon insertion of said artificial tooth into a human jaw the tissues of the jaw grow around said root without inflammation of the tissues due to their tolerance for the synthetic material of which at least the entire surface layer of said root consists so that said root becomes firmly embedded in the tissues of the jaw.

8. An artificial tooth comprising, in combination, a crown; a solid hard core embedded in said crown and extending out of the same; and an artificial root completely covering the portion of said core extending out of said crown, at least the entire surface layer of said root consisting of synthetic material which is well tolerated by the tissues of the human jaw, particles of ivory mixed into said surface layer of synthetic material forming the neck portion of said artificial root and a portion of said ivory particles forming part of the outer face of said neck portion, whereby upon insertion of said artificial tooth into a human jaw the tissues of the jaw grow around said root without inflammation of the tissues due to their tolerance for the synthetic material of which at least the entire surface layer of said root consists so that said root becomes firmly embedded in the tissues of the jaw.

9. An artificial tooth comprising, in combination a plurality of elongated artificial roots extending substantially in the same direction and arranged spaced from each other and having root portions adapted to be located in the gum tissue and upper end portions; a spacing disc arranged extending substantially transversal to said elongated artificial roots located between said upper end portions thereof spaced from the upper ends of said roots; and a crown member fitted over and secured to said upper ends of said roots above said spacing disc.

10. An artificial tooth comprising, in combination, three elongated artificial roots extending substantially in the same direction and arranged spaced from each other and having root portions adapted to be located in the gum tissue and upper end portions; a spacing disc arranged extending substantially transversal to said elongated artificial roots located between said upper end portions thereof spaced from the upper ends of said roots; and a crown member fitted over and secured to said upper ends of said roots above said spacing disc.

11. An artificial tooth comprising, in combination, a plurality of elongated artificial roots extending substantially in the same direction and arranged spaced from each other and having root portions adapted to be located in the gum tissue and upper end portions, at least the entire surface layer of said root portions adapted to be located in the gum tissue consisting of synthetic material which is well tolerated by the tissues of the human jaw; a spacing disc arranged extending substantially transversal to said elongated artificial roots located between said upper end portions thereof spaced from the upper ends of said roots; and a crown member fitted over and secured to said upper ends of said roots above said spacing disc.

References Cited in the file of this patent

UNITED STATES PATENTS

| | | |
|---|---|---|
| 448,745 | Wright | Mar. 24, 1891 |
| 1,183,535 | Chayes | May 16, 1916 |
| 1,824,398 | Fleischhacker | Sept. 22, 1931 |
| 2,347,567 | Kresse | Apr. 25, 1944 |
| 2,449,522 | White | Sept. 14, 1948 |